US007418408B1

(12) United States Patent  (10) Patent No.: US 7,418,408 B1
Heppe  (45) Date of Patent: Aug. 26, 2008

(54) METHOD FOR PROVIDING VEHICLE INFORMATION AT A LIVE AUCTION

(76) Inventor: George E. Heppe, 736B County Road 2500 East, Homer, IL (US) 61849

( * ) Notice: Subject to any disclaimer, the term of this patent is extended or adjusted under 35 U.S.C. 154(b) by 483 days.

(21) Appl. No.: 10/899,981

(22) Filed: Jul. 27, 2004

Related U.S. Application Data

(60) Provisional application No. 60/490,811, filed on Jul. 28, 2003.

(51) Int. Cl.
*G06Q 30/00* (2006.01)
*G06F 17/30* (2006.01)
(52) U.S. Cl. .......................................... 705/26; 705/27
(58) Field of Classification Search .................. 705/26, 705/27
See application file for complete search history.

(56) References Cited

U.S. PATENT DOCUMENTS

| 5,774,873 | A |   | 6/1998 | Berent et al. ................... 705/26 |
| 6,006,201 | A | * | 12/1999 | Berent et al. ................... 705/27 |
| 2001/0029478 | A1 | * | 10/2001 | Laster et al. ................... 705/37 |
| 2002/0143646 | A1 | * | 10/2002 | Boyden et al. ................ 705/26 |
| 2003/0036964 | A1 | * | 2/2003 | Boyden et al. ................ 705/26 |
| 2003/0130966 | A1 | * | 7/2003 | Thompson et al. ............ 705/500 |
| 2003/0158806 | A1 | * | 8/2003 | Hanley et al. .................. 705/37 |
| 2004/0044614 | A1 | * | 3/2004 | Wagner ......................... 705/37 |
| 2004/0172266 | A1 | * | 9/2004 | Sheinson et al. ................ 705/1 |
| 2005/0246266 | A1 | * | 11/2005 | Stefanovic et al. ............ 705/37 |

FOREIGN PATENT DOCUMENTS

JP       2002288468 A   * 10/2002

OTHER PUBLICATIONS

Author unknown, "Manheim Auctions Selects Cysive, Inc. To Integrate And Deliver Car Auction Information," PR Newswire, New York, Jun. 4, 2001, p. 1.*
Kline, Greg, "Valuable Information," News Gazette, Champaign, Ill., Aug. 27, 2001, p. D1.*

* cited by examiner

*Primary Examiner*—Jeffrey A. Smith
*Assistant Examiner*—Amee A Shah
(74) *Attorney, Agent, or Firm*—Singleton Law Firm, P.C.; Alan R. Singleton (57) ABSTRACT

Detailed information about a particular used motor vehicle is quickly provided to a potential buyer having a personal digital assistant equipped with a receiving means. To provide the information, it is first necessary to obtain standard information about used motor vehicle values in digital form from a provider of such information. It is then necessary to obtain specific information about an inventory of used motor vehicles from the owner or seller of the vehicles. The standard information and the specific information are then integrated on a server computer and transmitted to the potential buyer.

3 Claims, 9 Drawing Sheets

| Memo 2 of 2 | Blue Book |
|---|---|
| 2001 Saab 9-3 Hatchback 2D | |
| VIN: | |
| Stock Number: CBGY-784 | |
| Color: Dk. Blue | |
| VIN Verification | 0 |
| Glass | -170 |
| Tire Wear | -78 |
| Exhaust System | 0 |
| Air Conditioning | 0 |
| Wheel Alignment | 0 |

[Done] [Details]

FIG. 15

Add One Item
Enter new item or pick from list:
Misc.                    [Keypad]
VIN Verification
Glass
Tire Wear
Exhaust System
Air Conditioning
Wheel Alignment
Upholstery

[Done] [Add] [Rename] [Delete]

FIG. 16

Choose Mileage Range
25000      to 65000    [Clear]
| 0 | 65000 |
| 5000 | 70000 |
| 10000 | 75000 |
| 15000 | 80000 |
| 20000 | 85000 |
| 25000 | 90000 |
| 30000 | 95000 |

[OK] [Cancel]              [By AM/Y]

FIG. 17

Choose Avg Miles / Year
2500      to 7500     [Clear]
| 0 | 2500 |
| 2500 | 5000 |
| 5000 | 7500 |
| 7500 | 10000 |
| 10000 | 12500 |
| 12500 | 15000 |
| 15000 | 17500 |

[OK] [Cancel]              [By Range]

FIG. 18

```
Kelley Blue Book - 1 of 2
Make:              Jul-Aug 2004 data
        ( Acura )
Year:
        ( 2002 )
Model:
        ( CL )
Trim:
        ( 3.2 Coupe 2D )
( Evaluate )( Enter VIN )( View Saved )
```

FIG. 19

```
KBB Values           ▼ From Auction
Retail:      ▸ $46550
Wholesale:   ▸ $41525
Appraisal Impact:  $0
Jul-Aug 2004 data
2003 Chevrolet Corvette
Z06 Hard Top 2D
Key: ........................................
( Add Appraisal )            ( E/T )( Save )
( <- )( Mileage )( Equip )( Details )( Done )
```

FIG. 20

```
        Preferences           ⓘ
  ☑ Show Retail Value
  ☑ Show Wholesale Value
  ☑ Show Appraisal Impact Value ( State: ) California Saved Vehicle List
  ☐ 2-Digit Year  ☑ Show Key
  ☐ Show Book Date
  ( Cancel )              ( OK )
```

FIG. 21

```
Kelley Blue Book - 1 of 2
Make:              Jul-Aug 2004 data
        ( Chevrolet )
Year:
        ( 2003 )
Model:
        ( Corvette )
Trim:
        ( Z06 Hard Top 2D )
( Evaluate )( Enter VIN )( View Saved )
```

FIG. 22

*Enter VIN*

1G1YY12S435

| 0 | 1 | 2 | 3 | 4 | Clear |
| 5 | 6 | 7 | 8 | 9 | ⬅ |
| | | | | | SCAN |

Q W E R T Y U I O P
A S D F G H J K L
- Z X C V B N M .

(Find) (Cancel) (Evaluate)

FIG. 23

*Select Engine*

V8 5.7 Liter

(Cancel)

FIG. 24

*Select Transmission*

6 Speed Manual

(Cancel)

FIG. 25

*Enter Mileage*

17162

| 0 | 1 | 2 | 3 | 4 | Clear |
| 5 | 6 | 7 | 8 | 9 | ⬅ |
| | | | | | 000 |

23000 is the "zero point" which will not affect value.

(OK) (Cancel)

| Equipment List | |
|---|---|
| Multi Compact Disc | $450 |
| *Premium Wheels | |
| *Leather | |
| Navigation System | $550 |
| Integrated Phone | |
| *Power Door Locks | |
| *Power Steering | |
| *Power Windows | |
| *AM/FM Stereo | |
| Cassette | |
| *Premium Sound | $275 |
| F&R Side Air Bags | |
| | Done |

FIG. 32

KBB Values ▼ From Auction
Retail: ▸ $46550
Wholesale: ▸ $41525
Appraisal Impact: $-115
Jul-Aug 2004 data
2003 Chevrolet Corvette
Z06 Hard Top 2D
Key: Lane 5
(Edit Appraisal)           (E/T)(Save)
        (Mileage)(Equip)(Details)(Done)

FIG. 33

Saved Vehicles ▼ All
| Key | Year | Desc |
|---|---|---|
| ☐ Lane 6 | 2002 | Acura CL 3.2 Coup |
| ☐ Lane 4 | 1999 | Audi A4 Avant Wc |
| ☐ Lane 5 | 2003 | Chevrolet Corvet |
| ☐ Lane 3 | 1998 | Saturn SC1 Coup |

Delete Vehicles
ⓘ Do you wish to delete all vehicles or only the checked vehicles?
(All) (Checked) (Cancel)

METHOD FOR PROVIDING VEHICLE INFORMATION AT A LIVE AUCTION

CROSS-REFERENCE TO RELATED APPLICATION

This application claims the benefit of U.S. Provisional Application Ser. No. 60/490,811, Jul. 28, 2003.

FIELD OF THE INVENTION

This invention relates to the buying and selling of used motor vehicles. More particularly, this invention relates to a method of providing detailed information about a particular used motor vehicle to enable a potential buyer or seller to make a more informed buying decision.

BACKGROUND OF THE INVENTION

Millions of used motor vehicles are sold each year in the United States. The term "motor vehicles" is used herein to include automobiles, trucks, sport utility vehicles, motorcycles, boats, and the like. The value of a used motor vehicle depends on many factors, including its make and model, its original value, its age, its mileage, its condition, its options, etc. A number of services provide information about the value of used motor vehicles, including the National Automobile Dealers Association (NADA), Kelley Blue Book, and Black Book. These services provide the information in the form of guidebooks and also digitally. Dealers of used motor vehicles typically use one or more of the used motor vehicle value services.

Dealers of used motor vehicles buy, sell, and trade used motor vehicles to enlarge, reduce, and reconfigure their inventory on a regular basis. To facilitate this, large dealer-only auctions are held periodically throughout the United States where dealers buy and sell used motor vehicles. Dealers who plan to sell motor vehicles typically provide information about the vehicles to the auction beforehand so a list can be prepared and distributed to dealers who plan to buy motor vehicles. Each motor vehicle is auctioned on an auction block for a very short period of time, typically less than a minute. The larger dealer-only auctions have several auctions occurring simultaneously. A variety of tools are available to enable the potential buyer to place a bid at an auction. For example, Berent et al., U.S. Pat. No. 5,774,873, issued Jun. 30, 1998, discloses a system of computer workstations at remote locations that communicate with a host computer network that enables potential buyers to receive information about vehicles being auctioned and to bid on them.

In order to make an informed buying decision, a potential buyer of a used motor vehicle must gather specific information about the vehicle and then refer to one or more of the used motor vehicle value services. As a result of this time-consuming process, the potential buyer at a dealer-only auction may not have sufficient time to make an informed buying decision while a vehicle is being auctioned.

Potential buyers also need to have information about their own inventories. Dealers of used motor vehicles typically have information about their inventory stored in a database that is accessible at computers located at their dealership. While having such information at an auction would be highly desirable, there are many other situations in which it would be desirable for a dealer to retrieve the information when physically away from the dealership computers.

Accordingly, there is a demand for a method of quickly providing detailed information about a particular used motor vehicle to a potential buyer or seller.

SUMMARY OF THE INVENTION

The general object of this invention is to provide an improved method of providing detailed information about a particular used motor vehicle to a potential buyer or seller having a personal digital assistant equipped with a receiving means.

I have invented an improved method of quickly providing detailed information about a particular used motor vehicle to a potential buyer having a personal digital assistant equipped with a receiving means. The method comprises: (a) obtaining standard information about used motor vehicle values in digital form from a provider of such information; (b) obtaining specific information about an inventory of used motor vehicles from the owner or seller of the vehicles; (c) integrating the standard information and the specific information on a server computer; and (d) transmitting the integrated information in a form such that the information can be received by a potential buyer having a personal digital assistant equipped with a receiving means.

The method of this invention provides detailed information about a particular used motor vehicle to a potential buyer or seller having a personal digital assistant equipped with a receiving means.

DETAILED DESCRIPTION OF THE INVENTION

1. The Invention In General

Figure 1:
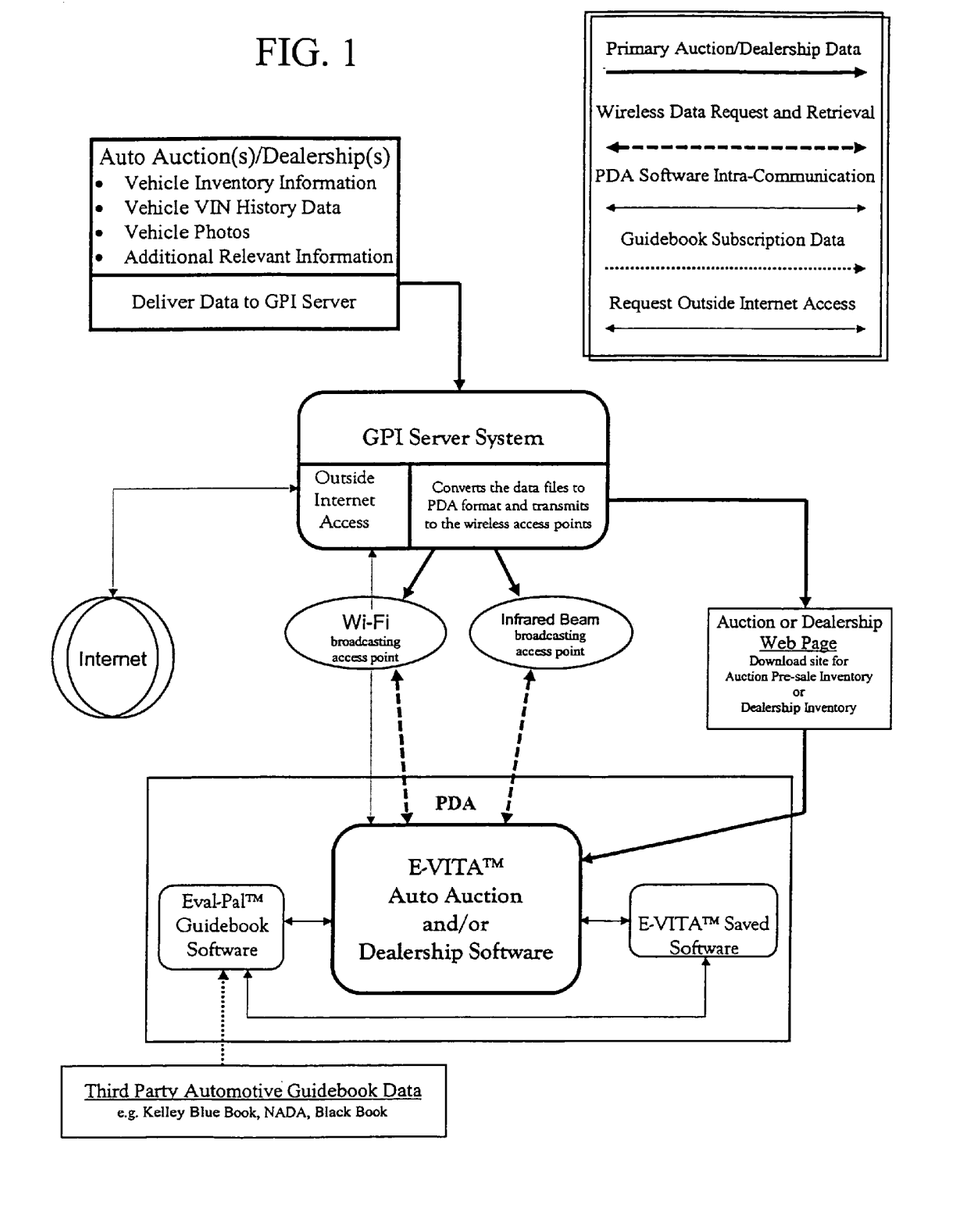
FIG. 1 is a diagram showing the flow of information in the method of this invention.

The method of this invention is a web based and/or stand alone delivery system for information about motor vehicles. Software applications comprise one component of the system. One of the software applications accumulates, integrates, retrieves, delivers, and organizes information relevant to inventoried vehicles in an accommodating format for use on handheld, wireless computers commonly referred to as Personal Digital Assistants (hereafter referred to as PDA). The information can be downloaded to a PDA in a PDA-deliverable format through email, either by synchronization or by wireless connection (the transmission and receipt of electromagnetic radiation) to the PDA via a website and/or through a local area network device. Examples of electromagnetic radiation include Wi-Fi (the IEEE 802.11 standard), Wi-Max, Bluetooth, and infrared. The information can be updated through supplemental dowhloads. The system assists those persons involved in dealer-only auctions and automotive dealerships. FIG. 1 is a diagram of the overall system showing the flow of information.

2. Use of the System for Automotive Dealer-Only Vehicle Auctions

The software applications offer a portable PDA information solution that provides to automotive dealers who are acting as buyers and attending automotive dealer-only vehicle auctions greater ease and speed to make critical purchasing decisions. In the vehicle auction environment, obtaining pertinent vehicle information is critical, and seconds matter. The ability to request, receive, and process various vehicle data facts and to query relevant databases (all performed at the buyers fingertips while maintaining a high degree of mobility) is becoming increasingly imperative. The auto auction is both a highly dynamic and urgent wholesale buying and selling process. Various purchasing decisions are made and continually readjusted throughout the day. Most vehicles spend less than a minute on the auction block before being sold or rolled out for the next vehicle in the lane to be bid upon. Each lane generally has an extensive line of vehicles waiting to enter the auction block. Multiple vehicles are being driven through multiple lanes concurrently and vehicle bidding is taking place at a furious pace in each lane.

Through the use of the system, vehicle buyers are offered a simple tool that assists them to search, sort, value, and analyze each vehicle with greater efficiency. This efficiency affords each buyer a greater amount of time to evaluate and then visually inspect vehicles at the auto auction and to enter into a greater number of bidding comfort zones. The buyer can qualify more vehicles so as to become a more active bidder (rather than active spectator) on a greater number of auto auction vehicles. The buyer can quickly identify those auction inventory matches of personal interest to the buyer, view vehicle history reports, view a vehicle's photo, create a vehicle recondition report, calculate industry standard guidebook valuations, and save the vehicle search result record(s) for later recall, all with greater ease and simplicity. The buyer can call up a single vehicle instantly by any assigned identification number (e.g., a run list number) to view valuable vehicle information critical for making an informed decision regarding the wholesale purchase of the vehicle.

Sellers of vehicles at the automotive dealer-only vehicle auctions are able to expand the informational exposure of their vehicles and benefit from the overall increase in the number of piqued buyers and from their bids being offered. Vehicle auto auctions benefit from increased revenue derived from the exchange fees levied to each buyer and seller due to the increased number of bids being accepted by sellers as a direct result of the system creating more buyers bids being offered as a whole.

3. Use of the System for Automotive Dealership Inventory

The system of this invention also offers a portable PDA information solution that provides inventory portability to the automotive dealership on a handheld PDA while incorporating a higher degree of functional use. The system provides the dealership sales staff greater ease and speed to quickly identify specific vehicles within their inventory, either from a single automotive dealership location or a group of dealerships that have been integrated through the system. The dealership sales staff is provided a simple-to-use system tool that assists them to locate, search, sort, value, and analyze each vehicle (from either a single dealership lot or from multiple lots) with greater efficiency without being tied to a desktop PC. The sales staff can quickly identify inventory matches, calculate guidebook valuations, create vehicle recondition reports (appraisals), and save each vehicle record (with notes) for later recall. The vehicle stock or VIN number can be used to quickly identify a single vehicle record. The dealership sales staff will be instantly prepared to answer most any customer question at any time and from virtually anywhere. The system can also be used to verify each vehicle's location on the auto dealership lot and then upload the collected inventory data information into the auto dealership's own inventory management system.

4. The Server

The server component of the system performs several functions. It: (1) receives a list of inventory vehicles from either a single or multiple auto auction house(s)/dealerships(s); (2) converts this list into a Palm operating system or Windows Pocket PC operating system (both operating systems and their handheld devices referred to as PDA database file); and (3) makes this file widely available for transfer to PDA handheld devices. The auto auction house(s)/dealership(s) can automatically send their vehicle inventory lists to the server in order to quickly and conveniently share their current inventories with customers, employees, web sites, etc. The database information can be downloaded to a PDA by synchronization or by wireless connection to the PDA via a website or through a local area network device and can continually be updated through supplemental downloads. The database information can be automatically and systematically deposited to a web site or web page and then made available for download.

The server incorporates a number of different software and hardware components that work in tandem and run silently, "behind the scenes," so they do not require regular user maintenance or even an in-depth knowledge of computers. This system can either accept or retrieve relevant data files that need to be converted to a PDA format and then transmit the files to be broadcast to the PDA.

5. The Hardware

The server contains two network interface cards (NICs) for use with two separate networks. The first NIC connects the server to the vehicle auction house/dealership existing network (and thus to the outside world), and the second NIC connects the server to a small, local network. This second NIC connects to a network switch, and it is to this switch that the rest of the local network hardware is connected. The rest of the hardware includes standard electromagnetic radiation access point devices.

6. The Server Software

The vehicle auction house/dealership sends vehicle inventory files (or the system can be programmed to retrieve such files) to the server via File Transfer Protocol (FTP), and the server's FTP application accepts these files and saves them to a user-defined directory on the hard drive. The server continually scans this directory for any valid file that meets its criteria. If a valid file appears (i.e., is received via FTP), the server takes the incoming text file, converts it to a format it can read, and then converts it again to a database file that is readable by the software application residing on the PDA.

Upon creation of the database file, the server moves it to another directory on its hard drive. This directory has been made "public" by an integrated web server, so that the database file can be transferred to a PDA handheld unit through a standard electromagnetic radiation connection or an infrared connection access point. At the same time, the server sends the new database file to the access points so that multiple concurrent PDA users can request either single or multiple database file(s) to be transferred to the software on their handheld units.

7. The PDA Software

The PDA software application generally handles the databases as subscription based. Each application has a unique registration and unlocking process that is specific to the application or database chosen, and for a specified period of time consistent with the term of the subscription. This unique PDA registration process also includes the administrative functionality to invalidate (turn off) a specific subscriber's subscription during its subscription term if the need should arise.

The software residing on the PDA is a vehicle tracking solution and is capable of storing, displaying, and managing multiple vehicle databases. It consists of two separate but complementary applications. The user is able to view all the inventory vehicles at once or, in the case of large databases, the user can define multiple search criteria in the respective database in order to find a particular vehicle or a list of various types of vehicles matching specific search characteristics. Along with the standard methods of installing database files to the PDA, the software on the PDA can request a wireless download of a new vehicle database file. From within the application, the user can use a file transfer utility to request a data file(s) from either a standard electromagnetic radiation access points.

While the auction and dealership PDA software allows the user only to view vehicles (and only in their respective databases), it is possible to save individual vehicles from separate databases to a "Saved List" in the application. Selected vehicles are all sent to one database, accessible only from the saved application, and are then available for editing in the application on the PDA (editing is "locked" in the main auction/dealership application to avoid any misrepresentation of the vehicles data). The user may also enter any new vehicle records manually by simply inputting a new record into the saved application.

Furthermore, the user can select a vehicle valuation option from within either of these PDA applications in order to access current automotive industry standard and automotive industry recognized guidebook values of the selected vehicle. This option takes the Vehicle Identification Number (VIN) of the selected vehicle in the application and sends it to the PDA valuation software. The valuation software takes the VIN (along with certain equipment options and mileage information) and calculates the then current guidebook value based upon which of the industry standard guidebooks the user has chosen to use and its accompanying VIN decoding software which assists in the verification of a vehicle's make, year, body style, trim level, engine, transmission, etc.

An optional feature of the PDA software is the ability to place a bid at an auction using the PDA through the server system network installed at the auction. This feature makes the bidder harder to spot by the other active bidders. The user is thus able to: (1) monitor what the current bid is on the vehicle and place single bids via the PDA; (2) set his top bid so that it automatically "bids up" if he is currently being outbid; and (3) potentially view other auctions that are in progress at different locations around the country and place bids to those auctions on any of their vehicles as it is being auctioned there. This is achieved form the ability to receive the database from the remote auction through the server system and being broadcast via the network at the auction he is attending, then searching the remote auction database for vehicles of interest, receive a photo and zoom in and/or pan the vehicle for a more detailed view, then sending his bid back through the network.

Another optional feature of the PDA software is the ability to determine how much capital is available to spend in situations where other persons may be buying for the same buyer. For example, a buyer at the auction may represent a single dealership or a dealership group (several dealerships under common ownership). As another example, there may be more than one buyer representing the dealership(s) at a single auction, or, there may be several buyers attending several different auction locations on the same day (all representing the same dealership(s)). With this optional feature, a buyer can: (1) check to see what is still currently available for his purchasing dollars by tapping a button that calls out and retrieves that information; (2) upload his own purchases so that others know what he has bought and so the total dollars still available to all other buyers can then be immediately adjusted; and (3) if he is using the automatic PDA bidding (the automatic bidding allows the buyer to set his limit and the system will advance his bid if any bid is higher until the active bidding goes beyond his cap), the automatic bidding can constantly check to see if he still has dollars available to spend and automatically stop bidding just before he exceeds the limit still available to him.

8. Sample Screen Displays

Figure 2:
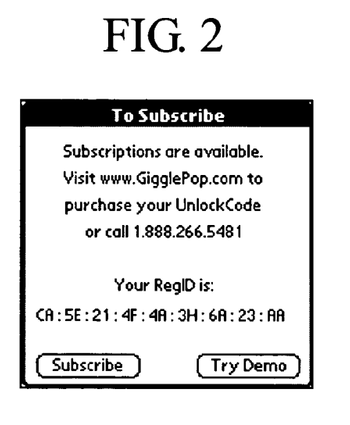
FIGS. 2 to 17 are screen displays of a first software application.
Figure 3:
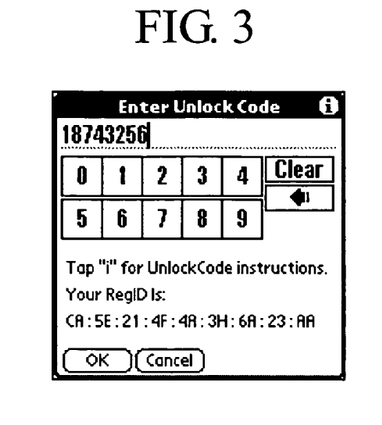

Sample screen displays are shown in FIGS. 2 to 17. In FIG. 2, the initial subscription screen display is shown. FIG. 3 shows the unlock code screen display.

Figure 4:
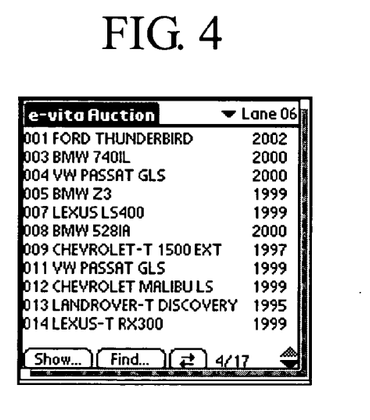
Figure 5:
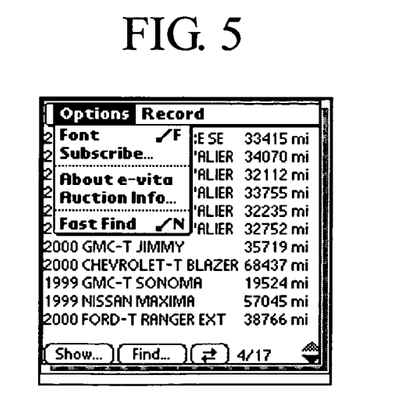
Figure 6:
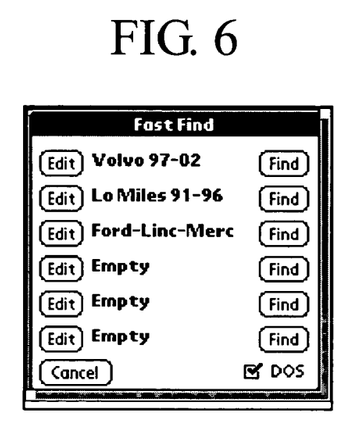

As shown in FIG. 4, the application provides each user with the ability to sort auction vehicles by their lanes (lane 06 is shown) and by the ascending order each vehicle is running within each lane (for dealerships, sort by make or by a category of the dealerships own choosing). As shown in FIG. 5, the user may show (set a display preference) the main screen in various viewable formats. As shown in FIG. 6, the Fast Find search preferences allow the user to predetermine the query criteria for various searches so the user does not have to populate the search fields each time a new search result is desired. DOS (Day-of-Sale) is currently a sub-search feature specific to auto auctions and allows the user to search for only those vehicles that have arrived during the day of the sale. Dealerships may wish to utilize this feature to flag any of the newly arrived vehicles on the dealership lot.

Figure 7:
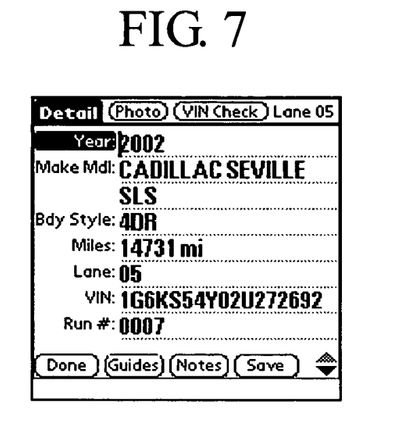
Figure 8:
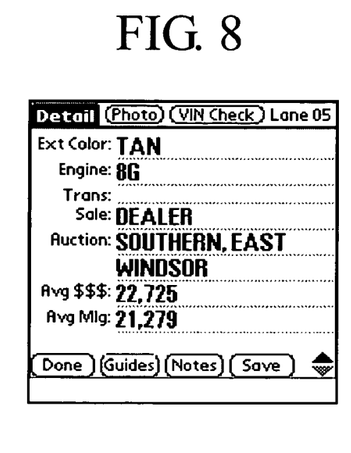
Figure 9:
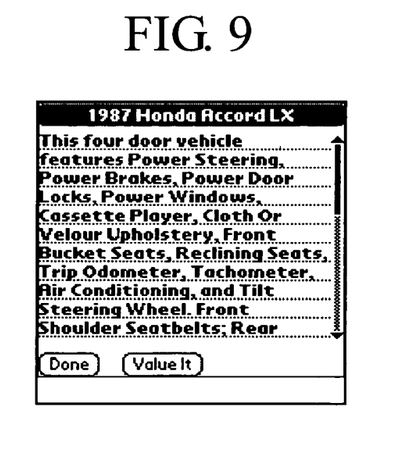

As shown in FIGS. 7 and 8, the detail on each vehicle allows the user to view multiple fields of information provided by the auction/dealership data provider and allows the user to save the record, or automatically access other relevant databases residing on the PDA by tapping the appropriate button, or to launch out and retrieve additional information that is being broadcast by the server system access points. As shown in FIG. 9, the user can tap the Notes button to view any vehicle options or special notes that have been attached to the vehicle record in order to better describe the vehicle as a whole.

Figure 10:
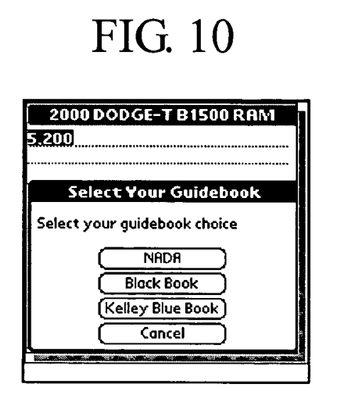
Figure 11:
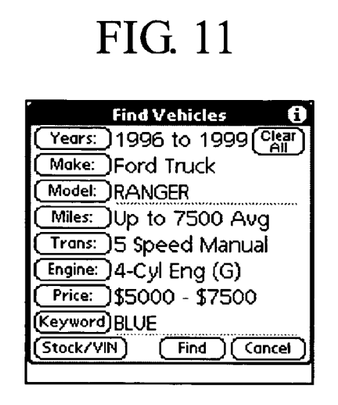
Figure 12:
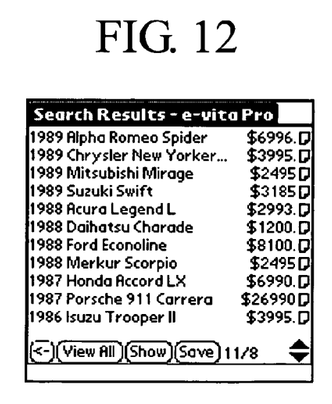

As shown in FIG. 10, the user can select which of the industry standard guidebooks to launch the specific vehicle record into for a fast and accurate valuation. Upon completion of the valuation, the user may select to return to the application or elect to stay within the guidebook application and create guidebook valuations independent from any vehicle records. As shown in FIG. 11, the user can find vehicles quickly by using the predetermined Fast Find or simply populate the Find screen fields and do a unique search. As shown in FIG. 12, once the user has completed a search, the user may save the entire search results or just a single record. The saved command will recognize if a vehicle has already been saved into the application and will disallow saving duplicates.

Figure 13:
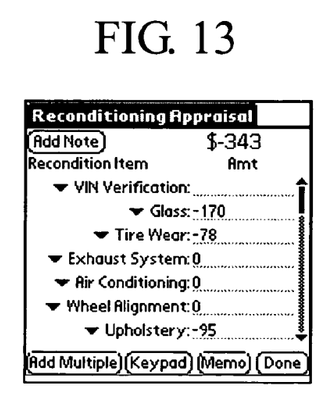
Figure 14:
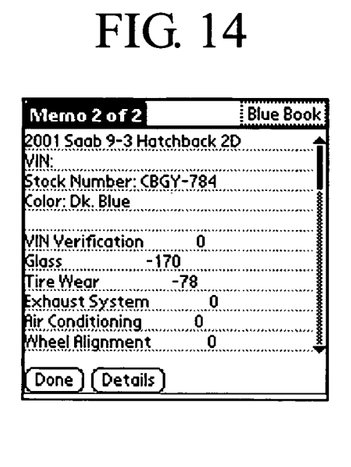
Figure 15:
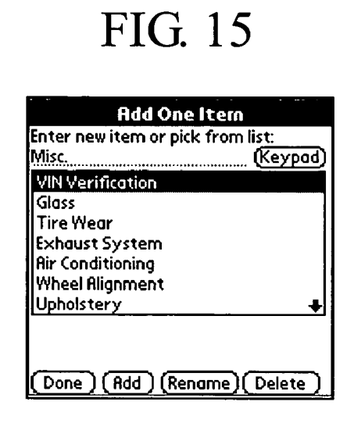

As shown in FIG. 13, the user can create a vehicle recondition list (appraisal form) by selecting any or all of the listed choices and entering an anticipated recondition cost or price for each item. As shown in FIG. 14, the user may then save the report for later recall or to obtain a printout. As shown in FIG. 15, the user may wish to use the standard default list of items in the recondition list, or rename the default items, or customize the report by creating new items of the users own choosing.

Figure 16:
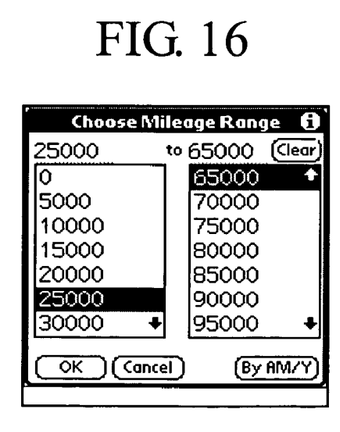
Figure 17:
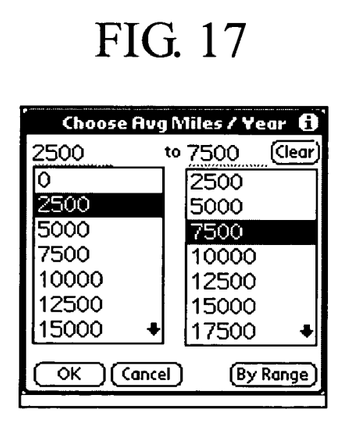

As shown in FIG. 16, the user may select as part of a find criteria to identify all vehicles whose mileage falls within a total mileage range. This is a commonly used search criteria. As shown in FIG. 17, the user may also elect to find all vehicles that are greater-than or less-than a specific average miles (or kilometers) per year (AM/Y). The AM/Y find feature is an uncommon feature to general search queries. The AMIY feature within the application allows the user to locate either high-mileage or low-mileage vehicles based upon the actual age of the vehicle. Whether using the range or AM/Y feature, the user may utilize the default brackets or customize the search by entering different mileage ranges of the users own choosing.

9. Basic PDA Features for Dealer-Only Auctions

The following categories are typically set for use at dealer-only auctions. A user may create a unique search query by selecting any single choice or combination of choices shown in category #1 below. Category #1 criteria include range of years, makes, model, range of miles or average miles per year (AM/Y), transmission, engine, lane number, keyword search, and day-of-sale (vehicles arriving while the auto auction is currently in progress). Category #2 criteria include searching for a specific vehicle record by VIN or run number. Category #3 criteria and features include pre-program up to 6 different preferences of search combinations (fast find), categorize by auction lanes and view vehicles by ascending run numbers, save the full search results or select single records, launch selected vehicles directly into industry recognized guidebook (e.g., Black Book, NADA, or Kelley Blue Book) databases for quick and accurate guidebook valuations and with an automatic return back to the auction vehicle record, display multiple fields of vehicle information, request and view current vehicle VIN history report, request and view current vehicle photos (with zoom and pan capability), view auction dates and times, view current staff directory, view general auction policy, view arbitration policy, and view auction light system policy.

10. Basic PDA Features for Automotive Dealerships

The following categories are typically set for use at automotive dealerships. A user may create a unique search query by selecting any single choice or combination of choices shown in category #1 below. Category #1 criteria include range of years, makes, model, range of miles, or average miles per model year (AM/y), transmission, engine, retail price range, and keyword search. Category #2 criteria include searching for a specific vehicle record by VIN or run number. Category #3 criteria and features include save the search results or select single records, launch selected vehicles into Black Book, NADA, or Kelley Blue book for quick and accurate guidebook valuations, display up to multiple fields of vehicle information and a list of vehicle options/notes, utilizes wireless technology to update inventory on the PDA (optional), VIN bar code scanning available for some PDA models, view a vehicle photo (with zoom and pan capability) for each vehicle record, and customize the vehicles show screen with mileage or retail price displayed as part of the vehicle description.

11. Valuation Software for Automotive Dealer-Only Vehicle Auctions and Automotive Dealerships:

The PDA valuation application algorithms assist to reduce larger guidebook databases down to what generally requires less than 2 MB of the PDA's free memory. Font size is maximized for easy viewing so as to reduce the chance of misreading a guidebook value. The application contains extensive information about used vehicles and their guidebook values. It contains the years, makes, models, and trims of vehicles. By providing information about a specific vehicle, the user can find out that vehicle's current wholesale trade, or retail value based upon which recognized guidebook the user has selected to use. The user can select the guidebook equipment for a specific vehicle from an easy to use checklist. By specifying the mileage of a particular vehicle, the application will calculate the effect that mileage has on the vehicle's guidebook value.

Figure 18:
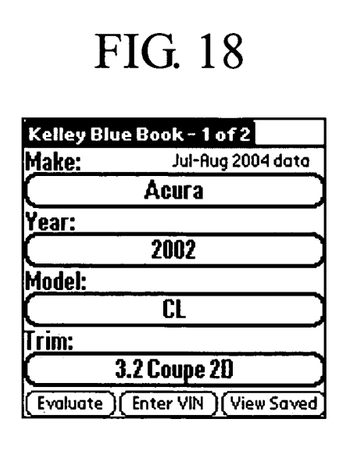
FIGS. 18 to 33 are screen displays of a second software application.
Figure 19:
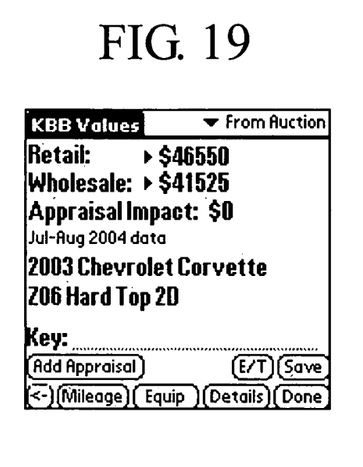

After evaluating a vehicle, the user can add a note, create a vehicle recondition report, and save the vehicle into a Saved Vehicle list for later reference. The user can enter a key to a saved vehicle—simply a short note that will help to categorize and sort the saved vehicles according to any organization system the user might want to develop. The user can look up a vehicle by entering the first 10 digits of its Vehicle Identification Number (VIN) or the full 17 VIN characters. This feature can also help verify the vehicles trim level to clarify if any vehicle insignia or signage has been changed or tampered with. The user may elect to have all saved vehicles and their values automatically revalued with each new update. The Kelley Blue Book application and valuation data are shown in the drawings for demonstration purposes. FIGS. 18 and 19 illustrate initial screens.

Figure 20:
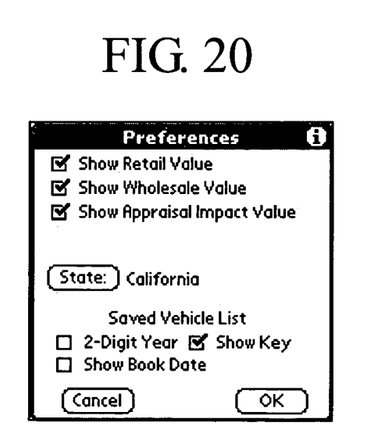

The Preferences page is shown as FIG. 20. The user chooses which of the states he wishes to value with and he can change to a new state at any time. He can also elect which type of values he wishes to display and he can also change it at anytime. He can customize the screen displays to show the information that he would like to view on the Saved Vehicles page.

Figure 21:
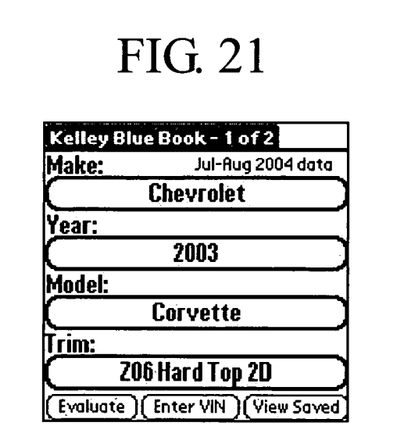

The Choose Vehicle Screen page is shown as FIG. 21. The current database date is displayed at the upper right of the Choose Vehicle screen. When the user touches each oval area, a pop-up screen appears with all of the vehicle choices. The user simply selects his choice of make, year, model, and trim. Or the user presses the Enter VIN tab and verifies a vehicle by its VIN.

Figure 22:
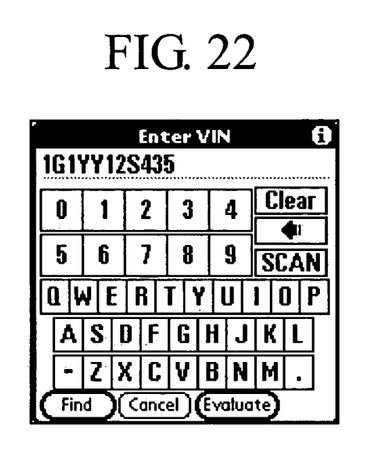

The VIN Entry page is shown as FIG. 22. The user enters the full VIN or just the first 10 characters. This useful decoder assists the user in verifying the authenticity of the vehicle he is valuing. After VIN entry, the user presses the Find tab to get a quick look at the vehicle, (returns to Choose Vehicle page displaying the vehicle found) or presses the Evaluate tab to go directly to the next page.

Figure 23:
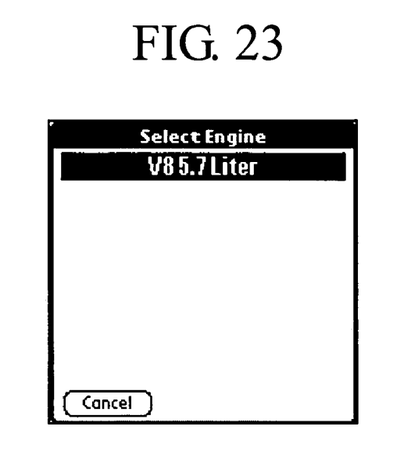

The Engine page is shown as FIG. 23. The user simply selects the applicable engine from the drop-down menu.

Figure 24:
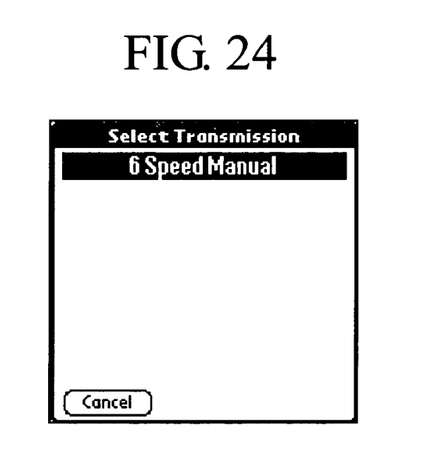

The Transmission page is shown as FIG. 24. The user selects his choice of transmission. The defaults is an automatic transmission.

Figure 25:
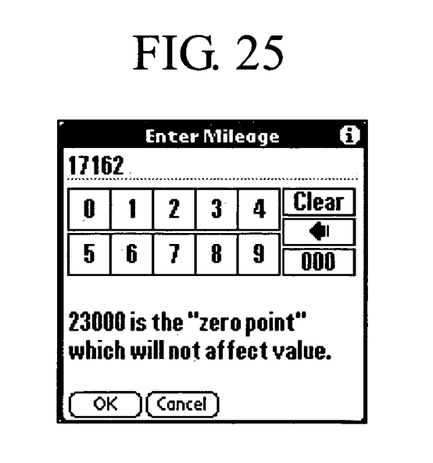

The Enter Mileage page is shown as FIG. 25. The user enter mileage by entering the actual mileage. Zero point miles are indicated. This is the mileage factor that has no impact on the value (dependent upon the guidebook choice, the user may also use mileage brackets or select a No Adjustment option which then does not take mileage into consideration as part of the valuation process).

Figure 26:
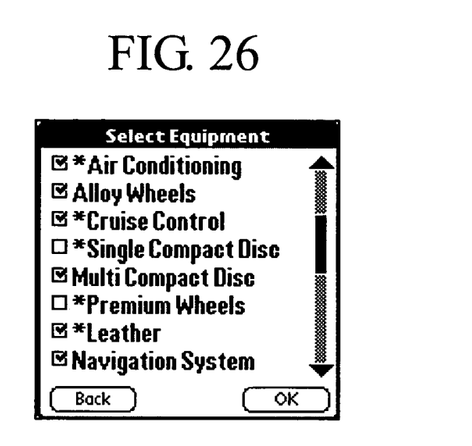

The Select Applicable Equipment page is shown as FIG. 26. The user simply checks the equipment options that make a true statement about the vehicle being valued. Asterisks indicate standard equipment.

Figure 27:
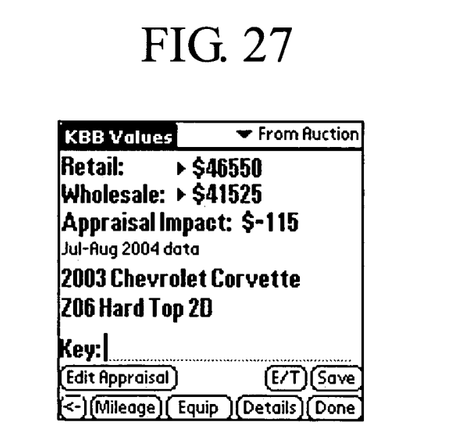

The Guidebook Values Screen page is shown as FIG. 27. The user can now view the Retail and Wholesale (or Retail, Trade and Loan on certain guidebooks) values. The user can enter notes about the valued vehicle for later review. The user can edit the note at any time. All notes are saved with each vehicle until the user deletes them, even after a new guidebook update is loaded. The actual database date the valuation was created in also displayed.

Figure 28:
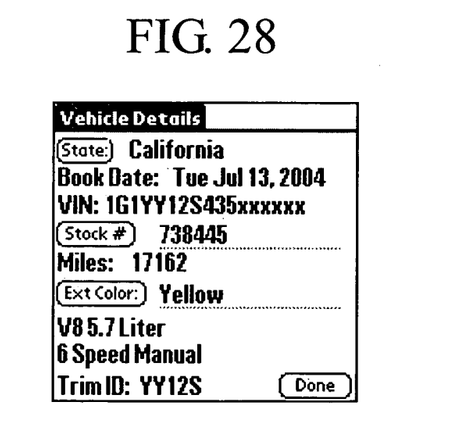

The Press the Detail tab page is shown as FIG. 28. By pressing the Detail tab on the Guidebook Values screen, the user finds the vehicle VIN if entered, trim number, and the date he last booked-out this vehicle's value. The user may select a color from a pop-up menu selection or enter a unique color of your own.

Figure 29:
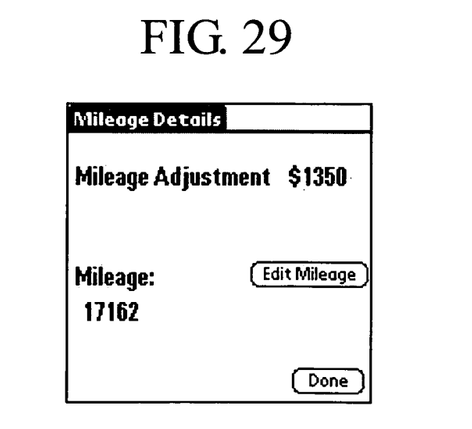

The Press the Mileage tab page is shown as FIG. 29. The user can view how the mileage selected has altered the value. The user can edit the mileage here if he wishes.

Figure 30:
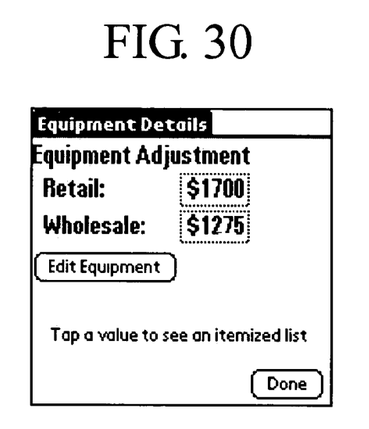

The Press the Edit Equipment page is shown as FIG. 30. The user can view how the equipment he has selected has added to or deducted from the value. The user can edit the equipment if he wishes, or show the specific equipment values.

Figure 31:
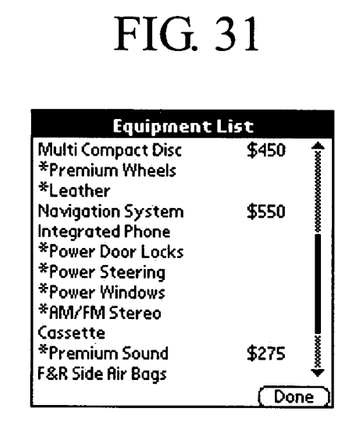

The Press Itemized List page is shown as FIG. 31. This list provides the user with a complete breakdown for each accessory selected and its impact on the vehicle's value.

Figure 32:
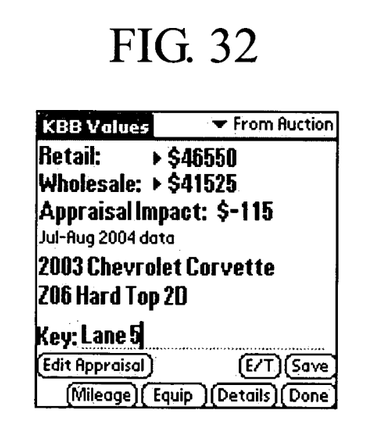

The Enter a Unique Key page is shown as FIG. 32. This useful category allows the user to enter a unique identifier of his choosing. It could be an auction lane run number or a simple code to use to quickly identify a specific vehicle from the many vehicles stored in the Saved Vehicles page. This is very useful while evaluating several similar type vehicles at an auto auction. The user can also add a personal note that stays attached to the vehicle record.

Figure 33:
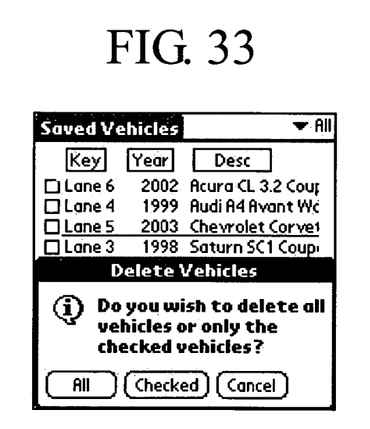

The Saved Vehicles page is shown as FIG. 33. This stores countless vehicles in a "quick-click memory". The user simply taps the vehicle of choice and it will be launched to its (guidebook) value screen. By tapping the header at the top of the Saved Vehicles page, the user can change any group from ascending to descending order, and back again, for quick identification and selection. The user can always delete any chosen vehicle or complete page of vehicles at any time. A double default option helps keep the user from making inadvertent deletions when hurried or preoccupied.

12. Additional Features

A large number of additional features are easily incorporated into the system. For example, CarFax is a commercial subscription-based provider of various types of information about specific motor vehicles. The CarFax information can be integrated into the system of this invention or it can be made readily accessible.

Another additional feature is the transmission of a signal to potential buyers who have registered an interest in a specific motor vehicle when it is about to reach an auction block.

Another additional feature is the ability of a potential buyer to receive current (real time) information from his home dealership about what types of motor vehicles are desired for purchase.

Another additional feature is the transmission of market reports by the auction. A market report lists the selling price of motor vehicles at the auction during a particular time period (that day, the past week, the past month, etc.).

Another additional feature is the transmission of information about the exact location of a specific motor vehicle on the lot of the auction. Such information makes it easier for the potential buyer to locate and inspect the motor vehicle prior to its sale. The information can be in the form of GPS (global positioning satellite) coordinates or in the form of a lot number, row number, etc.

Another additional feature is the ability of a user to make notes to himself regarding a specific motor vehicle.

I claim:

1. A method of providing information to a potential buyer at a live auction of used motor vehicles, the method comprising:
   (a) transmitting remotely via electronic means by a seller to a server specific information including an inventory of used motor vehicles that are to be sold at an auction where the vehicles are temporarily stored at a particular location at the auction and are sequentially placed on one or more auction blocks for sale, which specific information also includes the particular location of the vehicles at the auction site and the particular time at which each vehicle will be auctioned;
   (b) transmitting by the server the specific information remotely via electromagnetic radiation to the potential buyer who is physically present at the auction site and who has an apparatus equipped with a means for receiving the specific information;
   (c) selecting by the potential buyer particular vehicles from the specific information;
   (d) selecting by the potential buyer an information provider from a plurality of information providers from which to obtain standard information about used motor vehicle values;
   (e) obtaining by the server the standard information for all of the selected particular vehicles simultaneously from the selected information provider and integrating on the server the specific information and the standard information for each selected vehicle;
   (f) transmitting the integrated information by electromagnetic radiation to the potential buyer; and
   (g) displaying the transmitted integrated information on the potential buyer's apparatus.

2. The method of claim 1 additionally comprising:
   (e) transmitting from the potential buyer to the seller an interest in bidding on a specific motor vehicle; and
   (f) transmitting from the seller to the potential buyer a notification when the specific motor vehicle is about to be placed on the auction block.

3. The method of claim 2 additionally comprising:
   (g) transmitting bid information from the potential buyer to the seller by either electromagnetic radiation or through physical actions.

* * * * *